United States Patent
Rhoads et al.

(10) Patent No.: US 9,497,341 B2
(45) Date of Patent: Nov. 15, 2016

(54) METHODS AND SYSTEMS FOR USER-ASSOCIATION OF VISUAL STIMULI WITH CORRESPONDING RESPONSES

(75) Inventors: Geoffrey B. Rhoads, West Linn, OR (US); Tony F. Rodriguez, Portland, OR (US)

(73) Assignee: DIGIMARC CORPORATION, Beaverton, OR (US)

( * ) Notice: Subject to any disclaimer, the term of this patent is extended or adjusted under 35 U.S.C. 154(b) by 2360 days.

(21) Appl. No.: 12/244,531

(22) Filed: Oct. 2, 2008

(65) Prior Publication Data

US 2009/0125475 A1 May 14, 2009

Related U.S. Application Data

(60) Division of application No. 11/359,756, filed on Feb. 21, 2006, now abandoned, which is a division of application No. 09/690,773, filed on Oct. 17, 2000, now Pat. No. 7,003,731, which is a continuation-in-part of application No. 09/633,587, filed on Aug. 7, 2000, now abandoned, which is a continuation-in-part of application No. 09/343,104, filed on Jun. 29, 1999, now abandoned, said application No. 09/690,773 is a continuation-in-part of application No. 09/571,422, filed on May 15, 2000, now Pat. No. 6,947,571.

(60) Provisional application No. 60/134,782, filed on May 19, 1999.

(51) Int. Cl.
*H04N 1/00* (2006.01)
*G06F 3/00* (2006.01)
*H04N 1/32* (2006.01)

(52) U.S. Cl.
CPC .......... *H04N 1/00355* (2013.01); *G06F 3/002* (2013.01); *H04N 1/00358* (2013.01); *H04N 1/00374* (2013.01); *H04N 1/00968* (2013.01); *H04N 1/32144* (2013.01)

(58) Field of Classification Search
CPC ............ H04N 1/00355; H04N 1/00358; H04N 1/00374; H04N 1/00968; H04N 1/32144; G06F 3/022
USPC ........... 715/708, 763, 863, 864, 209; 706/60
See application file for complete search history.

(56) References Cited

U.S. PATENT DOCUMENTS

| 4,656,603 A * | 4/1987 | Dunn ............................ 715/835 |
| 4,780,599 A | 10/1988 | Baus |
| 4,907,264 A | 3/1990 | Seiler |
| 4,994,987 A | 2/1991 | Baldwin |
| 5,001,696 A | 3/1991 | Baldwin |

(Continued)

FOREIGN PATENT DOCUMENTS

| WO | WO 98/03923 | 1/1998 |
| WO | WO 00/58883 | 10/2000 |

(Continued)

OTHER PUBLICATIONS

Samsung, "A Mobile Phone that Doubles as a Camera", Samsung press release Jun. 23, 2000, found at http://www.samsung.com/us/news/newsPreviewRead.do?news_seq=529.*

(Continued)

*Primary Examiner* — Andrew Tank

(57) ABSTRACT

Methods and systems permit a user to decide what different responses are triggered when different visual stimuli are presented to the user's wireless communications device.

13 Claims, 3 Drawing Sheets

(56) References Cited

U.S. PATENT DOCUMENTS

| | | |
|---|---|---|
| 5,361,871 A | 11/1994 | Gupta |
| 5,382,779 A | 1/1995 | Gupta |
| 5,385,371 A | 1/1995 | Izawa |
| 5,415,553 A | 5/1995 | Szmidla |
| 5,424,524 A | 6/1995 | Ruppert |
| 5,444,230 A | 8/1995 | Baldwin |
| 5,474,457 A | 12/1995 | Bromley |
| 5,480,306 A | 1/1996 | Liu |
| 5,486,686 A | 1/1996 | Zdybel, Jr. et al. |
| 5,572,653 A | 11/1996 | DeTemple |
| 5,574,519 A | 11/1996 | Manico |
| 5,603,054 A * | 2/1997 | Theimer et al. ............... 710/6 |
| 5,613,004 A | 3/1997 | Cooperman et al. |
| 5,640,193 A | 6/1997 | Wellner |
| 5,703,795 A | 12/1997 | Mankovitz |
| 5,745,782 A | 4/1998 | Conway |
| 5,754,981 A | 5/1998 | Veeneman et al. |
| 5,765,176 A * | 6/1998 | Bloomberg ................ 715/209 |
| 5,774,666 A | 6/1998 | Portuesi |
| 5,781,914 A | 7/1998 | Stork |
| 5,832,119 A | 11/1998 | Rhoads |
| 5,838,458 A | 11/1998 | Tsai |
| 5,841,978 A | 11/1998 | Rhoads |
| 5,848,413 A | 12/1998 | Wolff |
| 5,862,260 A | 1/1999 | Rhoads |
| 5,878,155 A | 3/1999 | Heeter |
| 5,892,892 A | 4/1999 | Popat et al. |
| 5,899,700 A | 5/1999 | Williams et al. |
| 5,902,353 A | 5/1999 | Reber et al. |
| 5,905,248 A | 5/1999 | Russell et al. |
| 5,932,863 A | 8/1999 | Rathus |
| 5,933,829 A | 8/1999 | Durst |
| 5,938,726 A | 8/1999 | Reber et al. |
| 5,938,727 A | 8/1999 | Ikeda |
| 5,939,695 A | 8/1999 | Nelson |
| 5,948,038 A * | 9/1999 | Daly et al. ................ 701/117 |
| 5,950,173 A | 9/1999 | Perkowski |
| 5,963,916 A | 10/1999 | Kaplan |
| 5,971,277 A | 10/1999 | Cragun et al. |
| 5,979,757 A | 11/1999 | Tracy et al. |
| 5,986,651 A | 11/1999 | Reber et al. |
| 5,991,737 A | 11/1999 | Chen |
| 5,995,105 A | 11/1999 | Reber et al. |
| 6,002,946 A | 12/1999 | Reber |
| 6,012,102 A | 1/2000 | Shachar |
| 6,032,195 A | 2/2000 | Reber |
| 6,064,779 A | 5/2000 | Neukermans et al. |
| 6,081,629 A | 6/2000 | Browning |
| 6,081,827 A | 6/2000 | Reber et al. |
| 6,084,528 A | 7/2000 | Beach et al. |
| 6,108,656 A | 8/2000 | Durst |
| 6,119,944 A | 9/2000 | Mulla |
| 6,121,530 A | 9/2000 | Sonoda |
| 6,122,403 A | 9/2000 | Rhoads |
| 6,138,151 A | 10/2000 | Reber et al. |
| 6,148,331 A | 11/2000 | Parry |
| 6,154,738 A | 11/2000 | Call |
| 6,164,534 A | 12/2000 | Rathus et al. |
| 6,167,469 A * | 12/2000 | Safai et al. ................. 710/62 |
| 6,199,048 B1 | 3/2001 | Hudetz et al. |
| 6,229,924 B1 | 5/2001 | Rhoads et al. |
| 6,243,480 B1 * | 6/2001 | Zhao et al. ................ 382/100 |
| 6,249,226 B1 | 6/2001 | Harrison et al. |
| 6,282,362 B1 | 8/2001 | Murphy et al. |
| 6,286,036 B1 | 9/2001 | Rhoads |
| 6,307,949 B1 | 10/2001 | Rhoads |
| 6,311,214 B1 | 10/2001 | Rhoads |
| 6,321,992 B1 | 11/2001 | Knowles |
| 6,381,341 B1 | 4/2002 | Rhoads |
| 6,385,329 B1 | 5/2002 | Sharma et al. |
| 6,386,453 B1 | 5/2002 | Russell |
| 6,389,055 B1 | 5/2002 | August |
| 6,400,272 B1 | 6/2002 | Holtzman et al. |
| 6,408,082 B1 | 6/2002 | Rhoads et al. |
| 6,408,331 B1 | 6/2002 | Rhoads |
| 6,408,429 B1 * | 6/2002 | Marrion et al. ............... 717/100 |
| 6,411,725 B1 | 6/2002 | Rhoads |
| 6,411,994 B2 | 6/2002 | van Allen |
| 6,421,070 B1 | 7/2002 | Ramos et al. |
| 6,424,725 B1 | 7/2002 | Rhoads et al. |
| 6,425,525 B1 | 7/2002 | Swaminathan |
| 6,430,554 B1 | 8/2002 | Rothschild |
| 6,434,561 B1 | 8/2002 | Durst, Jr. et al. |
| 6,439,465 B1 | 8/2002 | Bloomberg |
| 6,445,460 B1 * | 9/2002 | Pavley ................ 358/1.15 |
| 6,448,979 B1 | 9/2002 | Schena et al. |
| 6,464,503 B1 | 10/2002 | Heit et al. |
| 6,466,329 B1 | 10/2002 | Mukai |
| 6,484,198 B1 | 11/2002 | Milovanovic |
| 6,512,919 B2 | 1/2003 | Ogasawara |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,542,933 B1 | 4/2003 | Durst, Jr. et al. |
| 6,549,933 B1 | 4/2003 | Barrett |
| 6,553,129 B1 | 4/2003 | Rhoads |
| 6,567,533 B1 | 5/2003 | Rhoads |
| 6,573,916 B1 | 6/2003 | Grossweiler |
| 6,580,808 B2 | 6/2003 | Rhoads |
| 6,590,996 B1 | 7/2003 | Reed et al. |
| 6,611,607 B1 | 8/2003 | Davis et al. |
| 6,614,914 B1 | 9/2003 | Rhoads et al. |
| 6,636,249 B1 | 10/2003 | Rekimoto |
| 6,647,128 B1 | 11/2003 | Rhoads |
| 6,647,130 B2 | 11/2003 | Rhoads |
| 6,650,761 B1 | 11/2003 | Rodriguez et al. |
| 6,650,877 B1 | 11/2003 | Tarbouriech et al. |
| 6,651,053 B1 | 11/2003 | Rothschild |
| 6,678,499 B1 | 1/2004 | Silverbrook et al. |
| 6,681,028 B2 | 1/2004 | Rodriguez et al. |
| 6,681,029 B1 | 1/2004 | Rhoads |
| 6,687,345 B1 | 2/2004 | Swartz |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,721,733 B2 | 4/2004 | Lipson |
| 6,738,491 B1 | 5/2004 | Ikenoue |
| 6,745,234 B1 | 6/2004 | Philyaw |
| 6,760,463 B2 | 7/2004 | Rhoads |
| 6,763,123 B2 | 7/2004 | Reed et al. |
| 6,766,363 B1 | 7/2004 | Rothschild |
| 6,768,809 B2 | 7/2004 | Rhoads et al. |
| 6,775,392 B1 | 8/2004 | Rhoads |
| 6,798,894 B2 | 9/2004 | Rhoads |
| 6,804,379 B2 | 10/2004 | Rhoads |
| 6,807,676 B1 | 10/2004 | Robbins |
| 6,813,039 B1 | 11/2004 | Silverbrook |
| 6,813,366 B1 | 11/2004 | Rhoads |
| 6,820,062 B1 | 11/2004 | Gupta |
| 6,829,368 B2 | 12/2004 | Meyer et al. |
| 6,832,717 B1 | 12/2004 | Silverbrook et al. |
| 6,860,424 B1 | 3/2005 | Philyaw |
| 6,868,405 B1 | 3/2005 | DeTreville |
| 6,879,701 B1 | 4/2005 | Rhoads |
| 6,917,691 B2 | 7/2005 | Evans |
| 6,917,724 B2 | 7/2005 | Seder et al. |
| 6,920,232 B2 | 7/2005 | Rhoads |
| 6,935,562 B2 | 8/2005 | Hecht et al. |
| 6,947,571 B1 | 9/2005 | Rhoads et al. |
| 6,965,682 B1 | 11/2005 | Davis |
| 6,965,873 B1 | 11/2005 | Rhoads |
| 6,968,057 B2 | 11/2005 | Rhoads |
| 6,970,886 B1 | 11/2005 | Levy |
| 6,975,746 B2 | 12/2005 | Davis et al. |
| 6,988,202 B1 | 1/2006 | Rhoads et al. |
| 6,995,859 B1 | 2/2006 | Silverbrook |
| 6,996,252 B2 | 2/2006 | Reed et al. |
| 7,003,731 B1 | 2/2006 | Rhoads et al. |

(56) References Cited

U.S. PATENT DOCUMENTS

| | | |
|---|---|---|
| 7,010,144 B1 | 3/2006 | Davis et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,050,603 B2 | 5/2006 | Rhoads |
| 7,051,086 B2 | 5/2006 | Rhoads et al. |
| 7,054,465 B2 | 5/2006 | Rhoads |
| 7,058,223 B2 | 6/2006 | Cox |
| 7,058,697 B2 | 6/2006 | Rhoads |
| 7,062,069 B2 | 6/2006 | Rhoads |
| 7,065,559 B1 | 6/2006 | Weiss |
| 7,095,871 B2 | 8/2006 | Jones et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,143,949 B1 | 12/2006 | Hannigan |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,224,995 B2 | 5/2007 | Rhoads |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,349,552 B2 | 3/2008 | Levy |
| 7,362,879 B2 | 4/2008 | Evans |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,421,128 B2 | 9/2008 | Venkatesan et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,454,035 B2 | 11/2008 | Miller et al. |
| 7,460,726 B2 | 12/2008 | Levy et al. |
| 7,461,136 B2 | 12/2008 | Rhoads |
| 7,466,840 B2 | 12/2008 | Rhoads |
| 7,486,799 B2 | 2/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,542,587 B2 | 6/2009 | Tian et al. |
| 7,545,952 B2 | 6/2009 | Brundage et al. |
| 7,548,643 B2 | 6/2009 | Davis et al. |
| 7,564,992 B2 | 7/2009 | Rhoads |
| 7,577,273 B2 | 8/2009 | Rhoads et al. |
| RE40,919 E | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,657,064 B1 | 2/2010 | Conwell |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,945,781 B1 | 5/2011 | Rhoads |
| 7,949,147 B2 | 5/2011 | Rhoads et al. |
| 7,953,270 B2 | 5/2011 | Rhoads |
| 7,953,824 B2 | 5/2011 | Rhoads et al. |
| 7,957,553 B2 | 6/2011 | Ellingson et al. |
| 7,961,949 B2 | 6/2011 | Levy et al. |
| 7,970,166 B2 | 6/2011 | Carr et al. |
| 7,970,167 B2 | 6/2011 | Rhoads |
| 2001/0001854 A1 | 5/2001 | Schena et al. |
| 2001/0003835 A1 | 6/2001 | Watts |
| 2001/0011233 A1 | 8/2001 | Narayanaswami |
| 2001/0034705 A1 | 10/2001 | Rhoads et al. |
| 2001/0044824 A1 | 11/2001 | Hunter et al. |
| 2001/0047428 A1 | 11/2001 | Hunter |
| 2001/0055407 A1 | 12/2001 | Rhoads |
| 2002/0009208 A1 | 1/2002 | Alattar et al. |
| 2002/0010941 A1 | 1/2002 | Johnson |
| 2002/0023148 A1 | 2/2002 | Ritz et al. |
| 2002/0023218 A1 | 2/2002 | Lawandy et al. |
| 2002/0032698 A1 | 3/2002 | Cox |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0199387 A1 | 10/2004 | Wang |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2005/0229107 A1 | 10/2005 | Hull |
| 2006/0013435 A1 | 1/2006 | Rhoads |
| 2006/0041591 A1 | 2/2006 | Rhoads |
| 2006/0251291 A1 | 11/2006 | Rhoads |
| 2007/0041667 A1 | 2/2007 | Cox |
| 2007/0055884 A1 | 3/2007 | Rhoads |
| 2007/0108287 A1 | 5/2007 | Davis et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0125475 A1 | 5/2009 | Rhoads et al. |
| 2009/0286572 A1 | 11/2009 | Rhoads et al. |
| 2010/0045816 A1 | 2/2010 | Rhoads |
| 2010/0062819 A1 | 3/2010 | Hannigan et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| WO | WO 01/15021 | 3/2001 |
| WO | WO 02/01379 | 1/2002 |

OTHER PUBLICATIONS

Rekimoto et al., "CyberCode: Designing Augmented Reality Environments with Visual Tags", Proceedings of DARE 2000 on Design-

(56) References Cited

OTHER PUBLICATIONS ing Augmented Reality Environments (DARE'00), Elsinore, Denmark, Apr. 12-14, 2000, copyright ACM 2000, pp. 1-10.*

Waldherr et al., "A Gesture Based Interface for Human-Robot Interaction", Autonomous Robots, vol. 9, No. 2, Sep. 2000, pp. 151-173.*

Arai et al, "Retrieving Electronic Documents with Real-World Objects on InteractiveDESK," UIST '95, Nov. 14, 1995.

Arai, "PaperLink: A Technique for Hyperlinking from Real Paper to Electronic Content," Conference on Human Factors in Computing Systems, May 18, 1997.

Aust, D., "Augmenting Paper Documents with Digital Information in a Mobile Environment," MS Thesis, University of Dortmund, Department of Computer Graphics, Sep. 3, 1996.

"D Marks the Spot," Popular Mechanics, Aug. 1, 2000.

Digimarc press release, "Digimarc MediaBridge Reader Software Now Available for Mac Users," 2 pp., Jul. 17, 2000.

Digimarc Stock Prospectus, Form S-1, Sep. 21, 1999, through p. 45.

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

Foote, Content-Based Retrieval of Music and Audio, Proc. of SPIE, vol. 3229, pp. 138-147, 1997.

Heiner et al, Linking and messaging from real paper in the Paper PDA, ACM Symposium on User Interface Software and Technology, UIST '99, Nov. 7-10, 1999, 8 pp.

Holmquist, Token-Based Access to Digital Information, Proc.1st Int'l Symp. on Handheld and Ubiquitous Computing 1999, pp. 234-245.

IBM Corp, "Universal Interactive Device," Research Disclosure Database No. 410129, Jun. 1998.

Ishii, Tangible Bits: Towards Seamless Interfaces Between People, Bits and Atoms, Proc. of CHI '97, Mar. 22-27, 1997, 8 pp.

Lee, "Fingerprinting," Chapter 8 in Information Hiding Techniques for Steganography and Digital Watermarking, Boston, MA, Artech House, pp. 175-190, 2000.

Ljungstrand et al, "WebStickers: Using Physical Tokens to Access, Manage and Share Bookmarks to the Web," DARE 2000, Apr. 12, 2000.

Pascoe, The Stick-e Note Architecture: Extending the Interface Beyond the User, Proc. of the 2d Int'l Conf on Intelligent User Interfaces, pp. 261-264, Jan. 6-9, 1997.

Rekimoto, "Augment-able Reality: Situation Communication through Physical and Digital Spaces," Prc. of 2d Int. Symp. on Wearable Computers, Oct. 1998.

Rekimoto, "CyberCode: Designing Augmented Reality Environments with Visual Tags," DARE 2000, Apr. 12, 2000.

Rekimoto, Matrix: A Realtime Object Identification and Registration Method for Augmented Reality, Third Asian Pacific Computer and Human Interaction, Jul. 15, 1998.

Ullmer, Models and Mechanisms for Tangible User Interfaces, MS Thesis, MIT, Jun. 1997, 83 pp.

U.S. Appl. No. 09/343,101, filed Jun. 29, 1999, Bruce L. Davis et al.

U.S. Appl. No. 09/343,104, filed Jun. 29, 1999, Tony F. Rodriguez, et al.

U.S. Appl. No. 09/413,117, filed Oct. 6, 1999, Geoffre B. Rhoads.

U.S. Appl. No. 09/482,749, filed Jan. 13, 2000, Geoffre B. Rhoads.

U.S. Appl. No. 09/507,096, filed Feb. 17, 2000 Geoffre B. Rhoads, et al.

U.S. Appl. No. 09/552,998, filed Apr. 19, 2000, Tony F. Rodriguez, et al.

U.S. Appl. No. 09/567,405, filed May 8, 2000, Geoffre B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,015, filed Oct. 25, 2000, Bruce L Davis, et al.

U.S. Appl. No. 09/697,009, filed Oct. 25, 2000, Bruce L. Davis, et al.

U.S. Appl. No. 13/084,981, filed Apr. 12, 2011, Geoffrey B. Rhoads. Prosecution excerpts from U.S. Appl. No. 11/874,054, filed Oct. 17, 2007 (original claims; Non-final rejection dated Jan. 20, 2011; Interview summary dated Mar. 15, 2011; and Amendment filed Apr. 18, 2011).

Rekimoto, "The World through the Computer: Computer Augmented Interaction with Real World Environments," Symposium on User Interface Software and Technology, 1995 (8 pages).

Venkatesan, Robust Image Hashing, Int'l Conf on Image Processing, Sep. 2000, pp. 664-666.

Wagner, Fingerprinting, IEEE Proc. Symp. on Security and Privacy, pp. 18-22, 1983.

Wold et al, Content-Based Classification, Search, and Retrieval of Audio, IEEE Multimedia Magazine, Fall, 1996, pp. 27-36.

* cited by examiner

METHODS AND SYSTEMS FOR USER-ASSOCIATION OF VISUAL STIMULI WITH CORRESPONDING RESPONSES

RELATED APPLICATION DATA

This patent application is a division of pending U.S. patent application Ser. No. 11/359,756, filed Feb. 21, 2006, which is a division of U.S. patent application Ser. No. 09/690,773, filed Oct. 17, 2000 (now U.S. Pat. No. 7,003, 731), which is a continuation in part of U.S. patent application Ser. No. 09/633,587, filed Aug. 7, 2000 (now abandoned), which is a continuation in part of U.S. patent application Ser. No. 09/343,104, filed Jun. 29, 1999 (now abandoned, but a continuation of which is pending as U.S. patent application Ser. No. 10/764,430, filed Jan. 23, 2004). U.S. patent application Ser. No. 09/343,104 claims priority from U.S. Provisional Application No. 60/134,782, filed May 19, 1999. U.S. patent application Ser. No. 09/690,773 is also a continuation in part of U.S. patent application Ser. No. 09/571,422, filed May 15, 2000 (now U.S. Pat. No. 6,947,571), which claims priority to U.S. Provisional Application No. 60/134,782, filed May 19, 1999. These patent applications are hereby incorporated by reference.

The subject matter of the present application is related to that disclosed in U.S. Pat. No. 5,862,260, and in application Ser. No. 09/503,881, filed Feb. 14, 2000 (now U.S. Pat. No. 6,614,914), which are hereby incorporated by reference.

TECHNICAL FIELD

The present technology relates to signal processing, and in particular relates to arrangements for associating user-defined behaviors with different visual stimuli.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (now U.S. Pat. No. 6,614,914) and U.S. Pat. No. 5,862,260, which are hereby incorporated by reference.

Content can also be processed to extract an identifier by techniques such as applying a hashing algorithm to the content data, yielding, e.g., a 128 bit identifier.

The present technology provides methods and systems for associating objects with machine behaviors. In this context, machine behaviors refer to actions by devices or systems in response to a triggering event. Examples of these behaviors include fetching a web page, opening an email client to send an email to a specific person, initiating a phone or video conference call, etc.

One illustrative embodiment is a method by which an end-user customizes behavior of a camera-equipped wireless communications device. The customization includes defining different user-desired behaviors that are associated with different visual stimuli, so that different behaviors are triggered when the user later presents different visual stimuli to the device.

Another illustrative embodiment is a computer including a user interface on which an image of an object is presented on the left side, and an image depicting a corresponding behavior is presented on the right side. Associated controls can permit the user to associate different objects with different behaviors.

Further features will become apparent with reference to the following detailed description and accompanying drawings.

DETAILED DESCRIPTION

Figure 1:
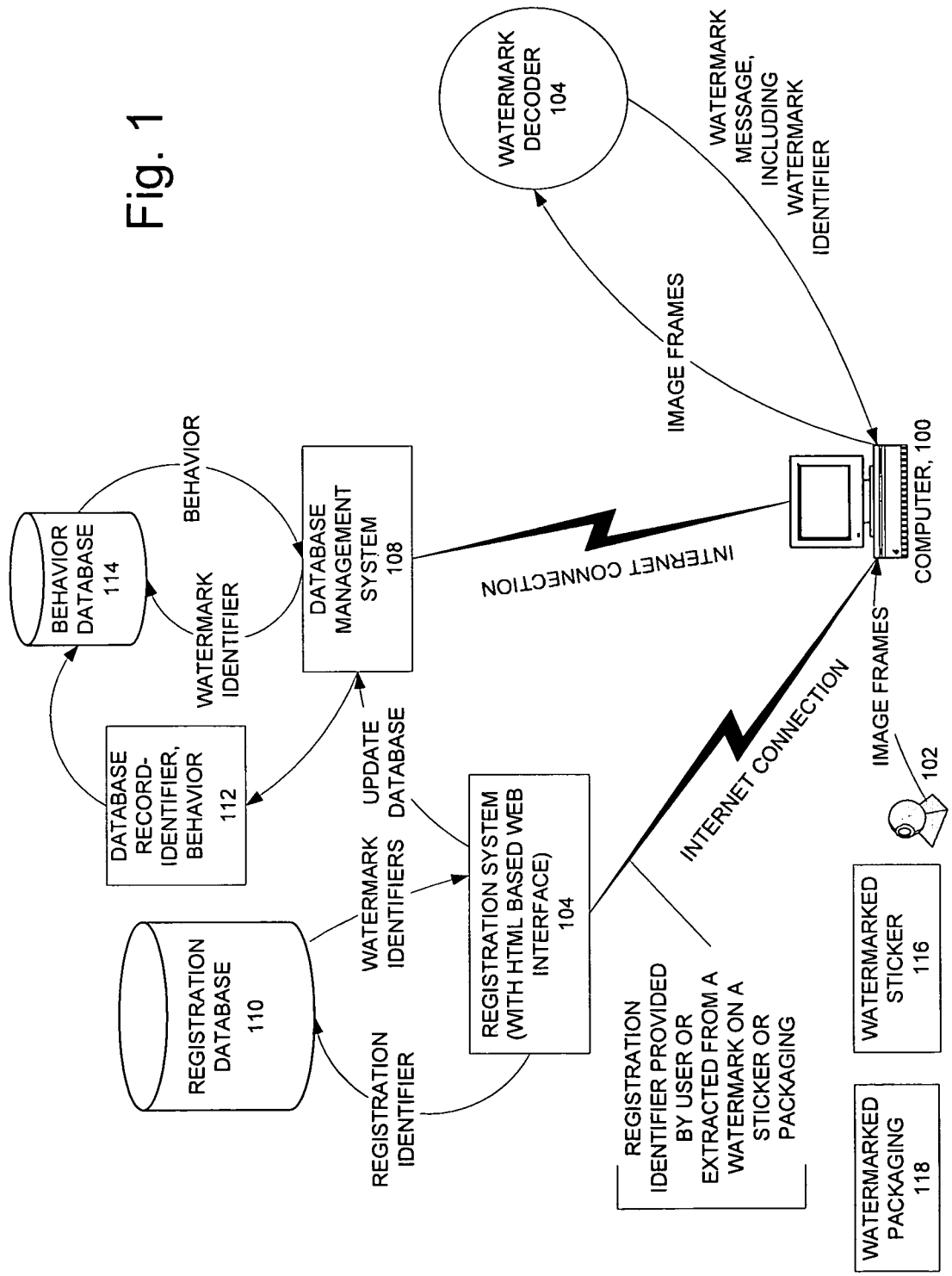
FIG. 1 is a system diagram depicting a system for associating watermark enabled objects with machine behaviors, and for triggering those behaviors in response to decoding watermarks.

The following description details a system and related methods for associating watermark enabled objects with machine behaviors. To illustrate the system, the description focuses on an example of watermark enabled stickers. As noted, the system applies more broadly to watermarking both physical and electronic objects. In particular, aspects of the system may be used for watermarking media signals like images, video and audio, as well as applying watermarks to physical objects. Watermarks may be applied to physical objects by placing a watermarked image on a physical object, by modulating the surface topology of the object, etc. See U.S. Pat. No. 5,862,260, for more information about watermark embedding of and decoding from physical and electronic objects.

Stickers in all their varieties have found an enduring place in our society. From the workplace (Post-It® brand message notes), to kids in a classroom, stickers have an inherent value associated with them, whether it be functional (seals, labels, etc.) or just to identify yourself with a particular affinity group (bumper stickers on cars). By placing a watermark on stickers they can be used in novel ways. By encoding a set of stickers with a watermark during production, specific machine behaviors can be assigned to them. These behaviors can be associated or even possibly changed by anyone from the manufacturer through the distributor, all the way to the end-user. In addition, the users can create their own watermark enabled stickers by creating an image, embedding a watermark in it, and associating the watermark with one or more machine behaviors.

These behaviors may include, but are not limited to the following:

Taking the user to a web-site linked to the watermark via a network address of the web-site or index to the network address.

Opening an email client to email to a specific person (e.g., a person whose email address is stored in the machine behavior description associated with the watermark).

Launching the user into an Interframe Relay Chat (IRC) session that other people with the same sticker can participate in.

Authenticating the user as part of a process of accessing a network resource, such as account information or access to a computer network.

Authentication the user in an electronic commerce transaction performed on a computer network.

Sending an electronic card.

Placing a phone or video-conference call.

As props in a computer game. For example, the prop is a multi-sided, or multi-faceted object, where each side or facet has a watermarked image conveying a different message used to control the game. The computer game includes a watermark decoder for extracting the messages from image frames captured of the prop. The message may directly carry the message or act as an index to a more detailed game instruction in a database, such as an instruction that changes over time based on changes to the corresponding database entry by the user or game manufacturer.

As a visual aide for disabled users.

Anywhere where machine vision is not feasible.

In each of the above applications, the watermark carries information that links the watermarked object (e.g., sticker) with a machine behavior. To trigger this behavior, a watermark decoder application captures an image or images of the watermarked sticker, extracts the watermark, and uses information embedded in the watermark to determine the associated machine behavior. The watermark decoder then takes action to initiate the machine behavior associated with the watermark.

For some applications, it is useful to enable the user to control the behavior associated with a watermarked object. This type of management may be handled by creating accounts for users and providing access to the accounts via some authentication method (email, passwords, etc.). For a number of reasons, these access methods can be problematic (losing passwords, asking kids for their email addresses, etc.). As an alternative, watermarks may be used to manage the process of associating behaviors with a watermarked object.

For example, in the scenario where a user wants to assign behaviors to a set of watermarked stickers they have received, they can hold up the first sticker (or its packaging), and be taken to a registration application to activate the stickers in the pack.

FIG. 1 is a system diagram depicting a system for associating watermark enabled objects with machine behaviors, and for triggering those behaviors in response to decoding watermarks. The system depicted in FIG. 1 is implemented on a computer network, namely, the Internet. The user accesses the system via a computer 100 connected to the Internet. The computer broadly encompasses a variety of devices, such as Personal Computers, set-top boxes, personal digital assistants, Internet appliances, set-top boxes, telephones (including wireless devices), audio and video players, and imaging devices (CCD or CMOS cameras, camcorders, printers, fax machines, copiers, etc.). The computer is connected to an image capture device 102, such as a PC camera or scanner, and includes watermark decoder software for decoding watermarks from images captured from the image capture device.

The system architecture shown in FIG. 1 includes a system (106) for managing the process of assigning behaviors to watermarked objects as well as a database management system (108) for initiating behaviors in response to decoding watermarks from the objects. These two systems may be integrated or implemented separately. In the application depicted here, the registration system and database management system are accessible via a network interface using standard network technology, including HTML, XML, and TCP/IP. A watermark embedding system has previously embedded watermarks carrying watermark identifiers into stickers. The stickers (or packages of them) also include a registration identifier used to activate the behaviors associated with them.

The registration system maintains a registration database including records of the registration identifiers and corresponding watermark identifiers. The registration identifiers are serialized numbers corresponding to the watermarked stickers or packages of them. The watermark identifiers are a form of object identifiers that are encoded into the watermarks on the corresponding stickers. The registration system maintains a registration database 110 of data records indicating the watermark identifiers associated with each registration identifier. When a user selects a behavior to be associated with a watermarked object via the registration system, the registration system sends an update 112 to a behavior database 114 specifying the behavior to be associated with a corresponding watermark identifier. In response, the database management system 108 updates its database to include a record that indicates the behavior associated with a particular watermark identifier.

The database management system 108 is also responsible for supporting machine behavior associated with a watermarked sticker in response to detection of the watermark on the sticker. It has a network interface for communicating with other computers over the Internet. In particular, it receives requests in the form of an XML packet from a watermark decoding computer, extracts a watermark identifier from the packet and looks up the associated behavior or behaviors in the behavior database. It then initiates the associated behavior. The details of how this behavior is carried out depend on the application and type of behavior.

In a typical registration process, the user accesses the registration system via a registration web site, which presents an HTML interface to the users' computers. The user may fetch the HTML pages of this interface using an Internet browser or application program, like the watermark decoder application executing on the computer 100. This interface enables the user to enter a registration identifier to start a process of associating behaviors with watermark identifiers embedded in watermarked stickers. In response to a registration identifier, the registration system returns a page that enables the user to specify the behavior. In the case where the behavior is linking a watermarked sticker to a web site, the user specifies the network address of the web site, such as a URL or IP address. In the case where the behavior is linking a watermarked sticker to an email message, the user specifies the email address of the email recipient.

As noted above, there are many other types of watermark enabled behaviors. They can be classified as providing information to the watermark decoding computer, launching some software program or machine action, or a combination of both. Table 1 below gives some examples of behaviors, and the related information and actions.

TABLE 1

| Behavior Type | Information Returned to Decoding Computer | Associated Machine or Software Actions |
|---|---|---|
| linking to web site | URL, web page | launching browser on client to fetch/render web page at URL |
| opening an email client | email address of target recipient | launching email client and populating address field with target recipient |
| starting a chat session | address of chat session | launching chat application (watermarks on the stickers can be designed such that only those holding the stickers can gain access to the chat session, each by showing the sticker to his or her watermark decoder enabled camera) |
| accessing account information or other network resources | address of account information | launching of browser application to access account information through a web interface; supplying user authentication information from watermarked object and/or from user (user password, user name, log on, etc.) |
| sending an electronic card | card template | launching client application to enable the user to design the card and add personal message, launching email application to send electronic card (or link to electronic card) |
| placing a phone or video conference call | phone number or IP address of destination | launching application to initiate phone call over the internet or telephone network |
| props in an interactive computer game | identifier of prop, and possibly other context information, such as game player holding the prop, etc. | game application receives prop and context information and responds accordingly |
| visual aid for disabled users | returns information in the form of graphics, audio, or video (may provide address of audio or video content at an audio or video server on the Internet) | browser, or other media player applications render the information (such as the streaming media) on the decoding computer |
| machine control | machine instruction | machine or software executes instruction |

For a given application, the registration system provides information to the user to enable the user to select the behavior and provide pertinent information, such as URL, IP address, phone number, email address, content file (e.g., audio, image or video file), etc. The registration system formulates a description of the behavior, associates it with the watermark identifier specified by the user, and creates an update 112 to the behavior database.

The user then uses the stickers or shares them with friends. To trigger the behavior of a sticker, a user captures an image of the sticker with an image capture device 102 using a watermark decoder application 104 executing on the computer 100. The watermark decoder extracts the watermark identifier from a watermark embedded in the image on the sticker. It then sends the watermark identifier to the database management system 108 via the Internet, which in turn, looks up the associated behavior. The database management system then triggers the associated behavior by sending information, or instructions back to the decoding computer. The decoding computer renders the information, and launches a software or other machine action associated with the instructions returned from the database. The database need not be implemented in a remote computer. For example, the database may be implemented in the watermark decoding computer or device.

As an enhancement to the registration process, objects may carry watermarks that automatically link the user to the registration web site. For example, one side of the sticker 116 or its packaging 118 may contain a watermark with the network address or an index to a network address of the registration web site. The user shows this part of the sticker or packaging to the image capture device. The watermark decoder extracts the watermark and looks up the network address in the behavior database, and launches a browser to fetch the registration web site. The watermark may also carry the registration identifier. In this case, the registration web site can tailor the web page returned to the user to be specific to the watermarked object. If the user or someone else previously associated a behavior with the sticker, the registration web site returns the current status associated with the registration identifier and the behaviors associated with the watermarked objects linked to that registration identifier. To get detailed information about particular watermarked objects during the registration process, the user can show the watermarked object to a camera, and use a watermark decoder to extract the watermark identifier and supply it to the registration system. In response, the registration system takes the watermark identifier, queries the behavior database via the database management system, and returns a description of the associated behaviors. This approach provides a simple and automated process of activating watermark enabled objects.

For more information about an object identifier registration system and system for linking objects with machine behaviors, see U.S. patent application Ser. No. 09/571,422 (now U.S. Pat. No. 6,947,571), which is hereby incorporated by reference.

Figure 2:
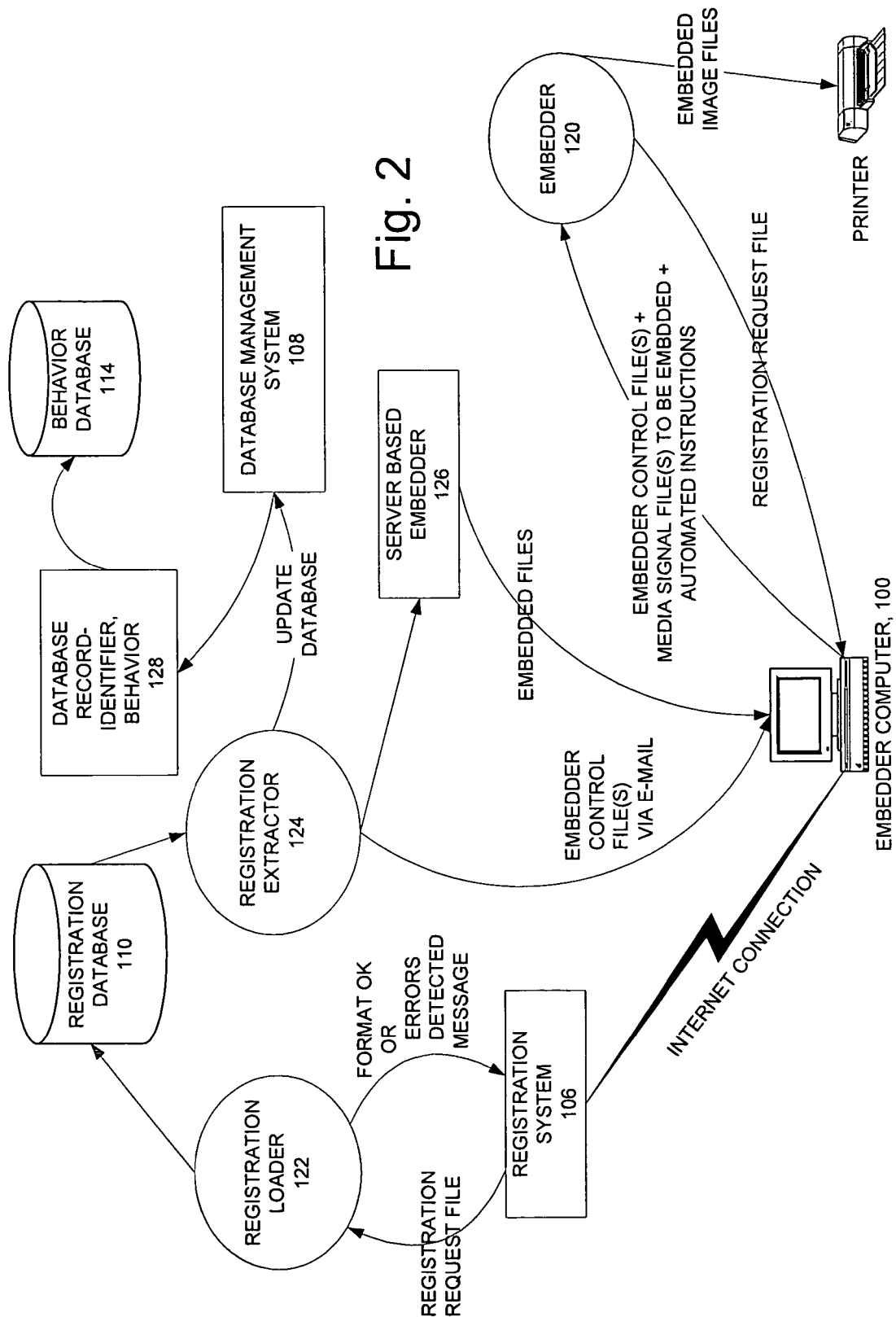
FIG. 2 is a diagram depicting a variant of the system shown in FIG. 1 showing system components for enabling users to perform watermark identifier registration and embedding.
Figure 3:
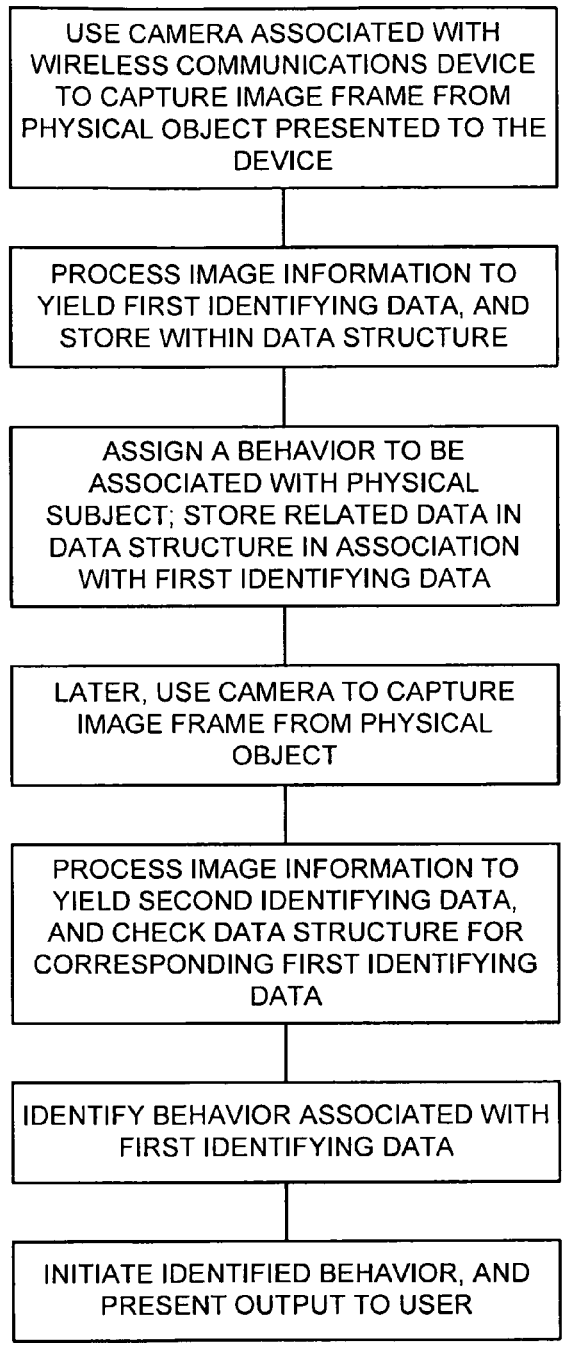
FIG. 3 is a flow diagram illustrating initiating an identified behavior and presenting output to a user.
Figure 4:
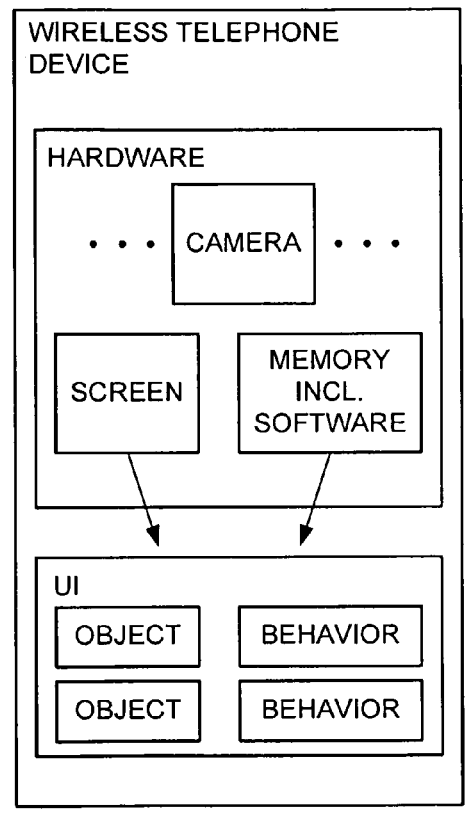
FIG. 4 is a block diagram of a wireless telephone device.

In some applications, the user may wish to create his or her own watermarked objects. FIG. 2 illustrates a system that enables users to assign watermark identifiers to corresponding behaviors and objects and update the behavior database. In this particular system, the user's computer includes a watermark embedder application (120). However, the embedder application may be implemented on a separate computer, such as a server on the Internet accessible via a client application on the user's computer 100. In the former case, the user embeds the watermark into the desired image content on his computer. In the latter case, the client supplies the image content to the server, which performs watermark embedding and returns watermarked images to the client. In both cases, the watermarked objects are created by printing the watermarked images on objects.

The process begins when an embedder 120 creates a registration request. In the system shown in FIG. 2, the embedder 120 is a software application running on the computer 100. The embedder formulates the request in a request file. The system provides a template for the request file. The request file specifies the number of watermark identifiers requested and the names of the media files to be embedded. The file may also specify the behaviors to be associated with each watermark identifier. Alternatively, the user can specify the behaviors to be associated with the watermark identifier at a later time using the methods described in this document. In the case where embedding is performed on a server as opposed to the user's computer, the request file may also include the media file (e.g., an image file) carrying the content to be embedded with the watermark identifier.

Next, the embedder connects, via a network connection, to the registration system 106. In particular, it connects to a registration web site via an Internet connection. This web site requests the embedder's username and password to authenticate it.

The user enters his username and password via a user interface displayed on the PC 100 and submits them to the web site for authentication.

Upon authentication, the registration website 106 returns an HTML page presenting the embedder with a user interface screen that allows the user to locate the embedder's registration request file for uploading to the web site. The user then enters a command to instruct the embedder to upload the selected request file.

The embedder provides the information required to locate the file on the embedder's computer and submits it for upload.

The registration request file is uploaded into a registration loader program 122.

The registration loader 122 performs a quick scan of the uploaded registration request file and reports back to the embedder any errors in format that it detects. If there are errors, the file is not processed.

If the registration request file is properly formatted, the embedder receives a confirmation from the registration website 106 that the request file has been successfully uploaded and will be submitted for processing by the registration loader 122.

The embedder may now either submit a new registration request file or logoff of the registration web site 106.

The registration loader 122 uses the information contained in the embedder's uploaded registration request file to automatically allocate (register) watermark identifiers in a registration database 110. The identifiers are in the form of serial numbers. Once this process is completed, the registration loader 122 initiates a request to a registration extractor 124 for these new registration entries.

Upon receipt of a request, the registration extractor 124 accesses the registration database 110 and creates embedder control files for each of these new registered watermark identifiers (e.g., serial numbers).

Upon completion of this process, the registration extractor 124 process sends the embedder control file(s) back to the embedder via Internet e-mail. In the event that the embedder is server based, the extractor sends the control file(s) (or a pointer to them) to the embedder server 126, which may be integrated with the registration system or implemented at a different Internet site. The extractor 124 also sends an update 128 to the behavior database 114 to create database records associating each of the watermark identifier with a behavior.

Once the embedder 120 has received the embedder control file(s), it uses these file(s), along with the media file(s) (in this case, image files) and a set of embedding instructions to the embedder 120 to instruct the embedder to automatically embed the list of watermark serial numbers included in the embedder control file(s) into the listed media files, producing a set of watermark-embedded media files. In the case where the embedder is server based, the client executing on the PC 100 uploads the media files to be embedded to the embedder server, either directly or as part of the registration process (e.g., as part of the request file). The embedder server then returns the watermarked files to the computer 100 via e-mail or other network file transfer protocol.

For detailed disclosure describing how to embed watermarks in media signals, including images, audio, and video, see U.S. Pat. No. 5,862,260, and co-pending application Ser. No. 09/503,881, filed Feb. 14, 2000, incorporated above.

The embedder may create watermarked objects by printing watermarked images on objects, such as stickers, documents, etc. The embedder sends the watermarked image to a printer 128, which in turn, prints the image on an object.

The above system provides a mechanism for linking objects to machine behaviors. As noted previously, this mechanism applies to both physical objects, like stickers and packaging, and electronic objects, like image, audio and video signals. It also applies to other forms of machine readable signal carriers that can be applied to such objects, including bar codes, magnetic stripes, Radio Frequency tags, integrated circuit chips, organic transistors, etc. These machine readable carriers can be used in the same way that watermarks are used in the example of watermarked enabled stickers above.

While these technologies provide a mechanism for linking objects to machine behaviors, there is a need for a tool that explicitly facilitates the creative coordination between the object and the behavior linked to it. The linking process results in a potentially complex database structure which not only embodies the fundamental object to behavior link, but also might include a hierarchy of delivered responses as a function of user implicit or explicit requests. Or, said in a quite different way, the creative process of linking an object to complex data-driven responses is itself a creative endeavor all to itself, involving thinking through the various different reactions that users will want and expect when using an object as a portal. The artist who is tasked with creating the choreography between an object and a simple or complex machine behavior will need explicit assistance from well designed tools, resulting in a database record which memorializes that creativity as an active element within a connectivity system described in this document and U.S. patent application Ser. No. 09/571,422 (now U.S. Pat. No. 6,947,571). The immediate creative output is a database structure. The long term creative output is the active use of that structure as a stimulus-response hub.

Whether a link design tool be web-server based, or whether it be a stand-alone application similar in kind to an Adobe Photoshop or a Quark Express, it is possible to offer visual metaphors to a creative designer which literally presents that designer with an image of the to-be-linked object along with explicit visual links to one or more data responses.

One embodiment of this tool for linking printed objects to web pages is a local computer application which presents an image of a printed object on the left side of an application's window pane and the image of a web page on the right side of the application pane. The images of the printed objects may be stored locally or fetched from a remote device (e.g., a content database) and rendered to the left side of the screen. Similarly, the web pages may be stored locally or downloaded from web sites on the Internet or some other network. The user interface of the application displays a control such as a button, labeled, "Connect", "Link" or some other active word representing the process of associating an object with a corresponding machine behavior. The user, having browsed through a series of objects to be linked, and browsed through a series of potential web site destinations, finding the best "matched-pair", pushes the button and off this relational link goes into a queue waiting to "go live", or, in other words, a temporary record is stored for a candidate link to be sent to the behavior database of the linking system described previously. A user can perform multiple links per session, queueing them up as they go, reviewing the queue at some point in time, then directing the links to become active at the behavioral database, as described previously and in the referenced documents.

An extension begins by generalizing the single printed item to be an icon or visual analogy to a related set of printed material. Graphical user interface methods can be employed to move, manipulate, view and otherwise process this icon in a fashion familiar to creative professionals. Likewise, surrounding this generalized icon representing the object(s) to be printed can be a whole series of icons representing a variety of potential data-delivered responses that are possible links. Existing web pages, placeholders for web pages to be designed, streaming media icons, Java application icons, "links to links" icons wherein a given response may explicitly point to a menu of actions presented to the end user. (end user=consumer doing the linking). This list of possible responses is incomplete but nevertheless representative of graphically displaying the possible relationships between printed material and data responses.

As in the baseline case, various relationships can be created between objects and responses, ultimately stored into a queue. The actual functionality and quality assurance of the links could be tested in the process. Once the creative artist is satisfied with their link or set of links, the queue can be sent to go live at the behavior database and further double checks on quality performed.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

While the technology is illustrated with reference to watermarked stickers, aspects of the technology apply to other object types including media signals like audio and video. There are number of different watermark embedding and decoding methods that may be used. The watermark embedding process may modulate features of a signal in the time, frequency, spatial or some other transform domain of the signal to be watermarked.

In addition to an object identifier, the watermark may be used to convey other information, such as an index to related metadata, rendering control instructions, etc. For example, the watermark can carry a network address or index to a network address to link the watermarked signal to a network resource such as a related web site.

Other machine readable codes may be embedded in an object and used to link the object to a machine behavior. Some examples include bar codes, magnetic stripes, RF tags, etc. The devices and methods used to extract an identifier from the machine readable code differ, yet the process for registering identifiers and associating behavior with objects may be similar.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method comprising:
    receiving a first image frame of a first physical subject captured using a camera;
    processing, using a computing device, image information corresponding to the first image frame to derive first identifying data therefrom;
    storing, within a data structure coupled to the computing device, the derived first identifying data;
    assigning, using the computing device, a behavior to be associated with the first physical subject, and storing data relating to the behavior within the data structure in association with the first identifying data;
    receiving a second image frame of a second physical subject captured using the camera;
    processing, using the computing device, image information corresponding to the second image frame to derive second identifying data therefrom; and
    checking, using the computing device, the data structure for stored first identifying data corresponding to the second identifying data and if the stored first identifying data and the second identifying data match, then:
        identifying a requested behavior associated with the corresponding first identifying data;
        initiating the requested behavior; and
        presenting an output from the requested behavior to a user of the device.

2. The method of claim 1, wherein each of the processing acts comprises applying a hashing algorithm.

3. The method of claim 1, wherein processing image information corresponding to the first image frame comprises applying a digital watermark decoding algorithm.

4. The method of claim 1, wherein processing image information corresponding to the first image frame comprises processing information within a wireless communications device associated with the camera to derive identifying data therefrom.

5. The method of claim 1, wherein storing comprises storing within a data structure within a wireless communications device associated with the camera.

6. The method of claim 1, wherein the first physical subject comprises at least a part of a human.

7. The method of claim 1, wherein the behavior associated with the first physical subject comprises an operation corresponding to a particular physical aspect of the first physical subject.

8. A non-transitory computer-readable medium having instructions stored thereon that, when executed by a computing device, cause the computing device to perform operations comprising:
    receiving a first image frame of a first physical subject captured using a camera;
    processing image information corresponding to the first image frame to derive first identifying data therefrom;
    storing the derived first identifying data within a data structure;

assigning a behavior to be associated with the first physical subject, and storing data relating to the behavior within the data structure in association with the first identifying data;

receiving a second image frame of a second physical subject captured using the camera;

processing image information corresponding to the second image frame to derive a second identifying data therefrom; and checking the data structure for stored first identifying data corresponding to the second identifying data and if the stored first identifying data and the second identifying data match, then:
 identifying a requested behavior associated with the corresponding first identifying data;
 initiating the requested behavior; and
 presenting an output from the requested behavior to a user of the device.

9. The computer-readable medium of claim 8, wherein each of the processing image information comprises applying a hashing algorithm.

10. The computer-readable medium of claim 8, wherein processing image information corresponding to the first image frame comprises applying a digital watermark decoding algorithm.

11. The computer-readable medium of claim 8, wherein processing image information corresponding to the first image frame comprises processing image information within a wireless communications device associated with the camera to derive the identifying data therefrom.

12. The computer-readable medium of claim 8, wherein storing comprises storing within a wireless communications device associated with the camera.

13. The computer-readable medium of claim 8, wherein the first physical subject comprises at least a part of a human.

* * * * *